May 22, 1951     D. FERGUSON ET AL     2,554,298
MACHINE FOR SLITTING RUBBER BACKED TEXTILE FABRIC
Filed Dec. 27, 1948     3 Sheets-Sheet 1
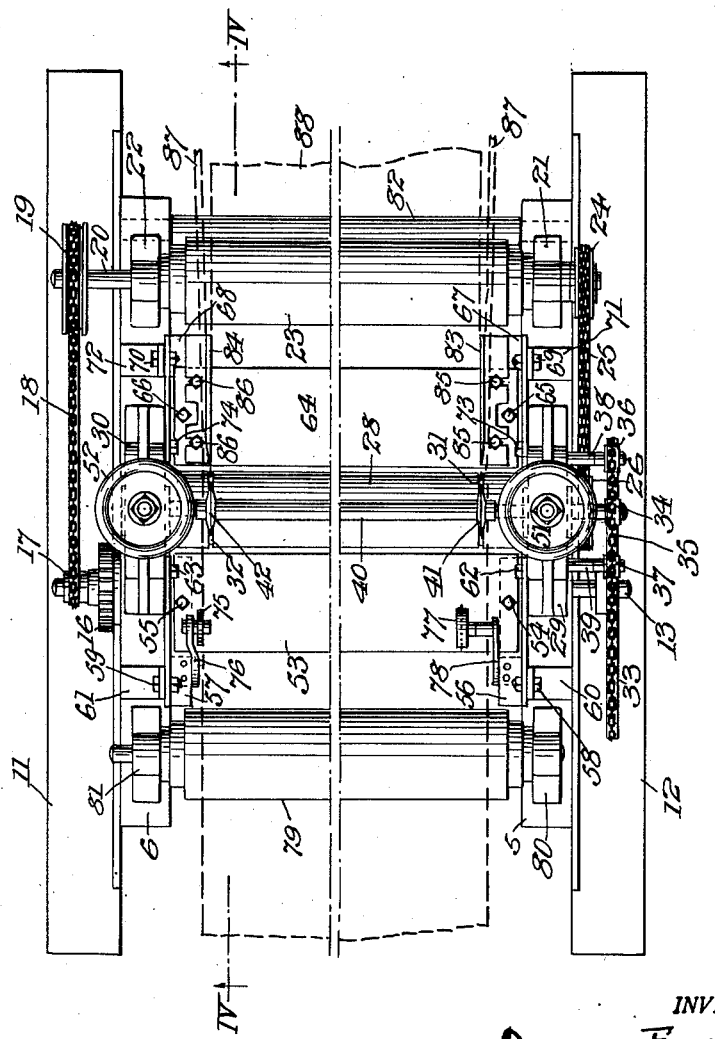
INVENTORS May 22, 1951 D. FERGUSON ET AL 2,554,298
MACHINE FOR SLITTING RUBBER BACKED TEXTILE FABRIC
Filed Dec. 27, 1948 3 Sheets-Sheet 2
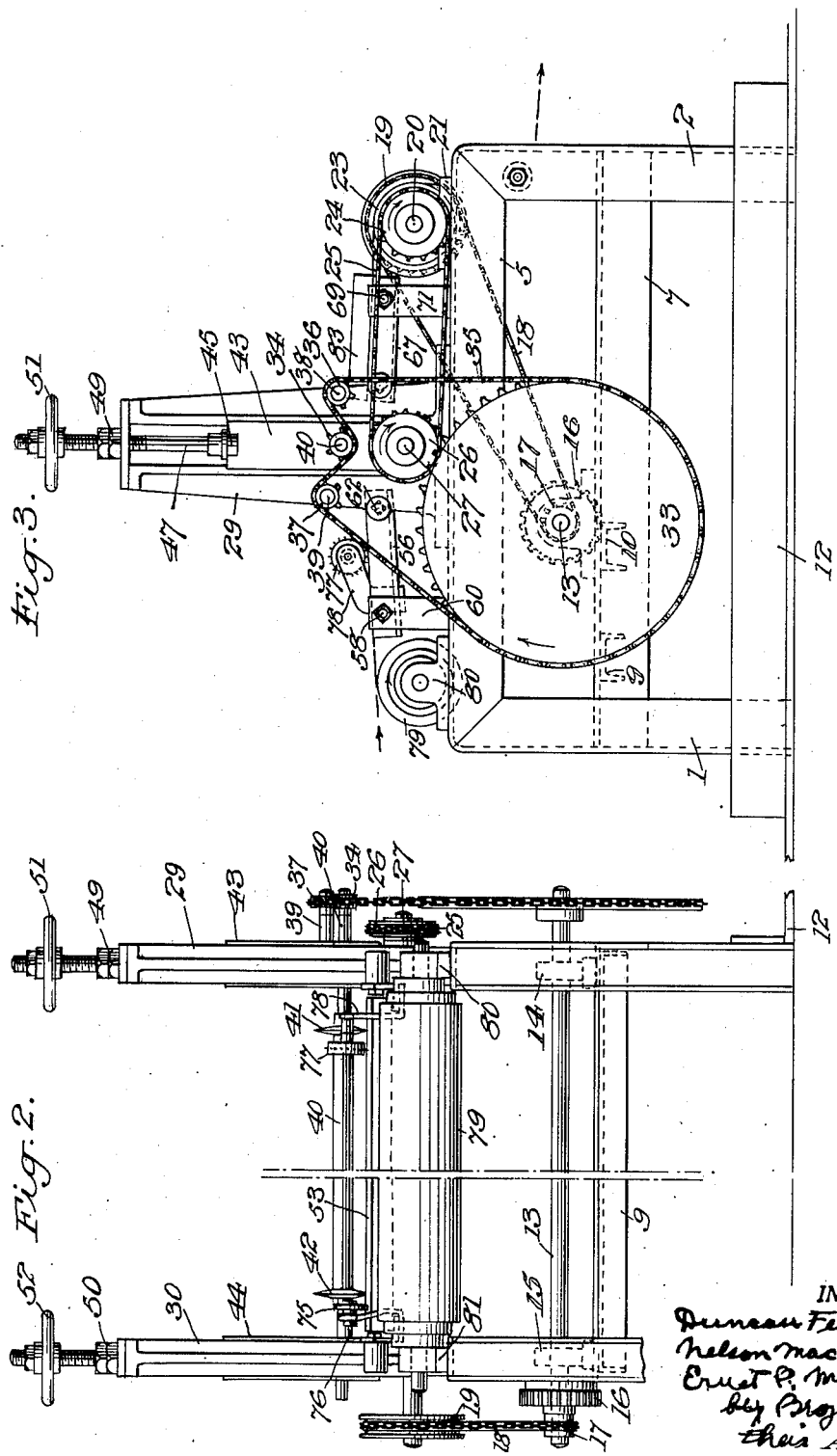
INVENTORS
Duncan Ferguson
Nelson Mac Dougall
Ernest P. Mayer
by Bray Seward
their ATTORNEYS

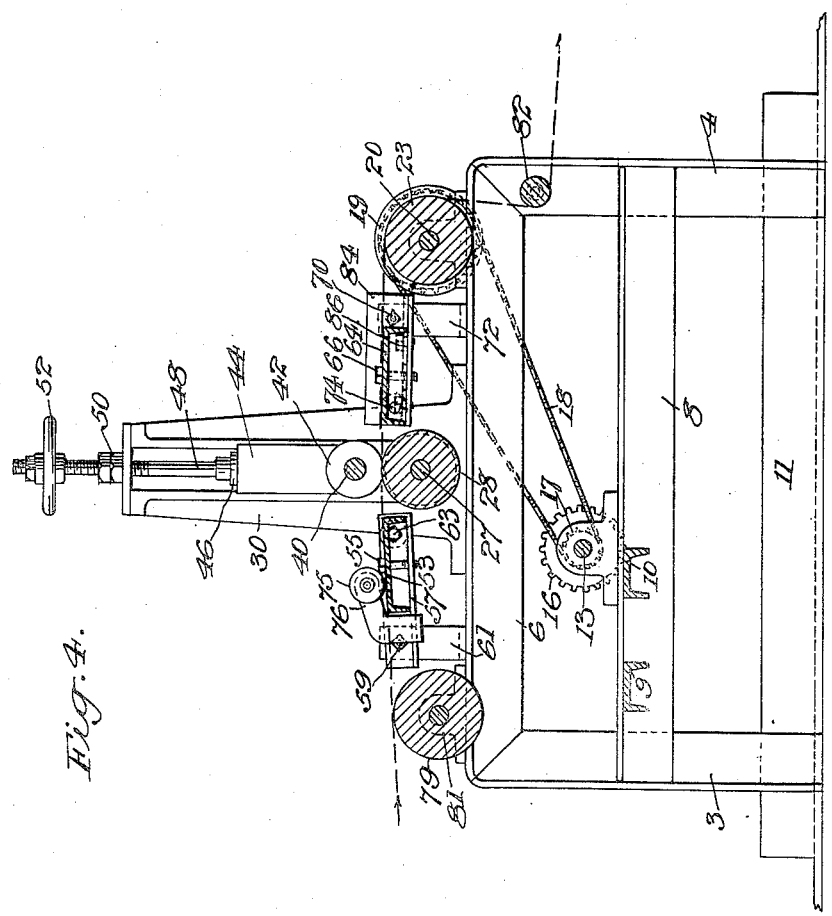

Patented May 22, 1951

2,554,298

UNITED STATES PATENT OFFICE 2,554,298

MACHINE FOR SLITTING RUBBER BACKED TEXTILE FABRIC

Duncan Ferguson, New Haven, Nelson Mac-Dougall, Bridgeport, and Ernst P. Meyer, Shelton, Conn., assignors to Sidney Blumenthal & Co., Inc., New York, N. Y., a corporation of New York Application December 27, 1948, Serial No. 67,512

12 Claims. (Cl. 164—65)

This invention relates to a machine for slitting rubber backed textile fabric in order to trim the same and form straight, true, parallel edges, and is particularly adapted for use upon lengths of pile fabric to the back of which is secured a layer or coating of sponge or foam rubber, or similar material.

An object of the invention is to provide such a machine which is adapted to operate simultaneously and continuously on both side edges of a piece, e. g., about fifty yards, of such composite material with a resulting product exhibiting such evenness and parallelism along its edges that a plurality of pieces, or portions thereof, may be adhesively united with a butt seam that is practically invisible.

Another object is to provide such a machine which includes feeding or drawing means that grips the material along a line extending substantially from edge to edge and at a point adjacent the slitting elements to promote a flat and smooth condition in that portion of the material upon which the slitting elements are acting.

Another object is to provide such a machine which embodies guide elements that are located in advance of the slitting elements, one of which guides serves for registering an edge while the other contacts the upper surface of the material; and in which the guide element that contacts the surface is preferably fitted with pins, or the like, for engaging the material to hold it firmly in desired position.

Another object is to provide such a machine in which the slitting elements cooperate with a backing member and in which the said member is elevated with relation to parts that support the material at each side thereof so that the material is in convex formation at the places where the slitters operate.

Another object is to provide such a machine in which the slitting elements are circular and are driven so that their cutting edges move in the same direction as and faster than the travel of the material.

Another object is to provide such a machine which includes means for splitting the severed waste edge portions from the material as it is slit and guiding the intermediate body of the material to a wind-up roll or the like.

A further object consists in providing certain improvements in the form, construction, arrangement and material of the parts whereby the above named and other objects inherent in the invention may be effectively attained.

A practical embodiment of the invention is shown in the accompanying drawings in which Fig. 1 represents a divided top plan view of the machine with the material passing therethrough;

Fig. 2 represents a divided broken front elevation of the machine without the material;

Fig. 3 represents a side elevation of the same; and

Fig. 4 represents a vertical section taken in the plane of the line IV—IV of Fig. 1, looking in the direction of the arrows, with the path of travel of the material illustrated by a broken line.

Pile fabric floor covering material is frequently furnished with an under layer of sponge or foam rubber in order chiefly to provide a cushioning effect and, as it is often desired to unite portions of such material edge to edge in the production of rugs and of carpeting as a substitute for broad loom products, there has arisen an essential requirement that the side edges of the woven and rubberized pieces be trimmed to almost perfect straightness, evenness and parallelism in order that portions may be united with butt seams that are normally unobserved. It has been our experience that means for accomplishing this result has not heretofore been produced, and the present invention is directed to the solution of this problem which it has most successfully achieved.

Turning now to a description of the embodiment shown in the drawings, a frame-work for supporting the operative parts comprises four uprights 1, 2, 3, 4; two top pieces 5, 6; two longitudinal brace-bars 7, 8, which extend from upright to upright below the top pieces; and two cross-bars 9, 10, which connect the longitudinal brace-bars. The top pieces, uprights and brace-bars are preferably composed of right angle iron and the cross-bars of channel iron, the parts being fitted together as illustrated in the drawings and secured by any suitable means such as bolts, rivets or welding. The frame as a whole is mounted on a pair of base stringers 11, 12, which are preferably composed of right angle iron and to which the uprights are suitably fastened in any appropriate manner.

The main drive shaft is denoted by 13, and it extends transversely of the machine, being journaled in bearings 14, 15, that are fastened on the brace-bars 7, 8. A spur gear 16 is keyed or otherwise fixed to one end of shaft 13 and is fitted to be rotated by any suitable source of power, such as a variable speed drive unit (not shown). On the extremity of shaft 13 outside of gear 16 is fixed a sprocket 17 that is connected by a chain 18 with another sprocket 19 which is fixed to a draw shaft 20 that extends across the machine and is supported in bearings 21, 22, which are secured on the top pieces 5, 6. The shaft 20 has fixed thereto in any suitable manner a roll 23, preferably wooden, that is surfaced with card clothing, or its equivalent, for the purpose of engaging the under surface of the material being slit to draw it through the machine, as will be hereinafter described.

The end of shaft 20 opposite to sprocket 19 is fitted with another sprocket 24 that is connected by a chain 25 with a sprocket 26 which is fixed to one trunnion 27 of a steel backing roll 28 that has its ends journaled in the lower part of a pair of stanchions 29, 30, that are mounted on and properly fixed to the top pieces 5, 6. Two circumferential grooves 31, 32, are formed in the surface of backing roll 28 for cooperation with the slitting elements, as will be pointed out later.

The main drive shaft 13 has fixed to its end away from gear 16 a large diameter sprocket 33 that is in driving connection with a small sprocket 34 by means of a chain 35 which passes around idler sprockets 36, 37, that are carried by studs 38, 39, which project from stanchion 29, to cause sprockets 33 and 34 to rotate in opposite directions. Sprocket 34 is fixed to an end of a slitter shaft 40 which is journaled in stanchions 29, 30, directly above backing roll 28, and shaft 40 has secured thereto a pair of sharp edged steel slitting discs 41, 42, that are so positioned as to cooperate with grooves 31, 32, in the backing roll 28. The journals for the slitter shaft are formed in blocks 43, 44, which are slidably fitted in the stanchions 29, 30, and are connected at 45, 46, with vertically disposed adjusting rods 47, 48, which are threaded in the tops of the stanchions and in pairs of lock nuts 49, 50, that rest thereon, the said rods being provided with hand wheels 51, 52, whereby the slitter shaft 40 may be moved vertically in the stanchion and the discs 41, 42, may be nicely adjusted with relation to the grooves 31, 32.

A feed table 53 for the material to be slit is positioned immediately in advance of the backing roll 28, and consists of a wide piece of channel iron which is arranged transversely of the machine with its web uppermost and has its ends bolted, as indicated at 54, 55, to angle irons 56, 57, which are in turn fastened by bolts 58, 59, to brackets 60, 61, that are mounted on the frame top pieces 5, 6, and by bolts 62, 63, to stanchions 29, 30. It will be noted (see Figs. 3 and 4) that the feed table is not level but slants upwardly toward the backing roll 28 so that the incoming material to be slit will take an upward course to the slitting discs. An angle of six degrees to the horizontal has been found to be practical and desirable for the feed table. A delivery table 64, which is like feed table 53, is located at the opposite side of the backing roll and is fixed in position in like manner, its ends being fastened by bolts 65, 66, to angle irons 67, 68, that are attached by bolts 69, 70, to brackets 71, 72, and by bolts 73, 74, to stanchions 29, 30. This delivery table takes the same angle to the horizontal as the feed table, with the result that the material being slit is in convex form or bent, so to speak, at the points where the slitting discs operate. If desired, the attachments of the angle irons 56, 57, 67, 68, to the brackets 60, 61, 71, 72, and stanchions 29, 30, may be of the bolt and slot type so that the height and/or slant of either or both tables may be varied.

An edge guide 75 is carried at the upper end of an angle arm 76 which is fastened, as by a bolt not shown, to the underside of angle iron 57, the said guide being immediately above feed table 53 and in such a location with respect to the adjacent slitting disc as to enable the operator accurately to register an edge of the incoming material and truly guide it to the slitting discs. At the opposite side of the machine a pin roll 77 is mounted in the upper end of an angle arm 78 which is bolted, or otherwise secured, to the underside of angle iron 56. This pin roll not only guides the material by engagement of its pins therewith, but also serves to press the material down on the feed table and hold it flat. Should it be deemed advisable, arm 76 may carry a pin roll like 77 in addition to guide 75 and arm 78 may carry a guide like 75 in addition to pin roll 77 or both arms may carry such guides or pin rolls only.

A supporting feed roll 79 is freely journaled in bearings 80, 81, that are fixed on frame top pieces 5, 6, the height and positioning of this roll being such as to lead the material in a substantially straight line onto the feed table 53. If desired, the bearings 80, 81, may be made adjustable horizontally and/or vertically to permit variation in the exact positioning of roll 79.

At the other end of the machine, a delivery guide roll or rod 82 has its ends mounted in frame uprights 2, 4, below draw roll 23, under which guide roll or rod the material is led to insure that it has sufficient circumferential contact with the draw roll to enable the latter to exert a firm pull upon the material.

For the purpose of splitting the severed edges of the material away from the body thereof and directing the latter along its course, a pair of splitter guides 83, 84, are mounted on delivery table 64 at opposite sides of the machine by bolt and slot connections 85, 85, and 86, 86, which permit lateral adjustment thereof. These parts 83, 84, are composed of angle metal and their uprising walls are in line with slitting discs 41, 42; the edges of said walls adjacent the discs being tapered or sharpened to facilitate the splitting of the trimmed off edges from the body of the material.

In operation, the rubberized pile fabric to be slit or trimmed along its edges, is supplied from a suitable roll and/or table (not shown) with its pile surface up and its front end is fastened by adhesive tape or in any other suitable manner to a leader strip of cloth, or the like, which latter is led manually through the machine, between the slitting discs 41, 42, and their backing roll 28, until its forward end embraces the draw roll 23, at which time the machine is set in operation and the feeding, slitting and splitting of the material are accomplished automatically, with the finished product passing from guide roll or rod 82 to a wind-up roll (not shown) or any other appropriate receiving means. The manual threading of the leader strip through the machine is facilitated by temporarily elevating the slitting discs through manipulation of hand wheels 51, 52. The difference in size of sprockets 33, 34, causes slitter shaft 40 to be rotated at high speed (approximately four hundred and fifty revolutions per minute has been found desirable), while the chain connection between said sprockets insures that the cutting edges of the slitting discs move in the same direction as the material upon which they are operating. Although the grooves 31, 32, cooperate with the said discs, the cutting is not performed by a shearing action but by single edge cutting, and the backing roll 28 need not be provided with grooves but may have a plain hard surface if desired. The speed of the main drive of the machine may be varied to meet requirements or best practice at any time, but the interconnection of the parts insures the relatively high speed of travel of the cutting edges of the discs as compared with the travel of the material being slit, regardless of the speed of the main drive. When one piece of material has nearly passed through the machine the latter is stopped and the front end of a succeeding piece is secured, as by adhesive tape, to the rear end of the first piece; whereupon the machine is re-started and the operation continues until the desired number of pieces have been treated, without the necessity of re-threading for each piece.

As has previously been indicated, the feed table 53 and delivery table 64 slope upwardly toward the top of backing roll 28, with the result that the material breaks or bends into convex form at the points where the slitting discs are active, and this greatly promotes the efficiency and accuracy of the cuts, which effect is enhanced by the high rotation speed of the discs.

As the material leaves the slitting discs, the trimmed edges, which are illustrated in broken lines on Fig. 1 and marked 87, 87, are split away from the main body of the material marked 88, and are collected in suitable receptacles or otherwise disposed of.

We have found in practice that this machine trims the edges of the material with almost perfect exactness, leaving them straight, true and parallel so that portions of the material may be united by almost invisible butt seams; and, further, that the machine operates speedily, efficiently and with the use of little power.

While we have hereinabove deferred to the use of this machine in connection with fabric combined with sponge or foam rubber, it should be noted that the machine is adapted for use upon fabrics combined with other backing substances or materials such, for instance, as compositions of other resins or elastomers natural or synthetic. Again, although only two slitting discs have been shown and described, their number could be varied as, for instance, by mounting a third on shaft 40 midway between 41 and 42 so as to split the material centrally and cause the delivery of two trimmed strips or carpet runners. In order to allow for cases where the thickness of the fabric, together with its backing, is such that there is danger of the pins on roll 71 piercing the material and having their ends bent by contact with table 53, with consequent liability of injury to the fabric as the pins are disengaged therefrom; the said table may be formed with a small depression or opening immediately below the roll 71 or, if preferred, a substitute roll with shorter pins may be provided.

It will be understood that various changes may be resorted to in the form, construction, arrangement and material of the parts without departing from the spirit or scope of our invention, and hence we do not intend to be limited to details herein shown or described except as they are included in the claims or are required by disclosures of the prior art.

What we claim is:

1. A machine of the character described comprising, means for feeding the material therethrough, a backing roll for supporting the material, a plurality of cutters arranged to cooperate with the backing roll, a feed table for slidably leading the material to the backing roll, and means for pressing the material against the feed table, the said feed table being provided with a depression located beneath said pressing means.

2. A machine of the character described comprising, means for feeding the material therethrough, a backing member for supporting the material, a plurality of cutters arranged to cooperate with the backing member, means for rotating the cutters with their cutting edges moving in the same direction as the material, and means for guiding the material to the cutters, said guiding means including an element for registering an edge of the material with a cutter and a pin roll for bearing upon the upper surface of the material.

3. A machine of the character described comprising, means for feeding the material therethrough, a backing member for supporting the material, a plurality of cutters arranged to cooperate with the backing member, means for rotating the cutters with their cutting edges moving in the same direction as the material, means for guiding the material to the cutters, and means for splitting the severed edges of the material away from the body portion thereof and guiding the latter from the cutters toward a delivery point, said means for guiding the material to the cutters including an element for laterally registering an edge of the material with a cutter and means for bearing upon the upper surface of the material, and said means for splitting away the severed edges of the material and guiding the body portion thereof toward a delivery point including vertical walls with tapered edges adjacent the cutters.

4. A machine of the character described comprising, means for feeding the material therethrough, a backing member for supporting the material, a plurality of cutters arranged to cooperate with the backing member, means for rotating the cutters with their cutting edges moving in the same direction as the material, means for guiding the material to the cutters, and means for splitting the severed edges of the material away from the body portion thereof and guiding the latter from the cutters toward a delivery point, said means for guiding the material to the cutters including an element for registering an edge of the material with a cutter and a pin roll for bearing upon the upper surface of the material, and said means for splitting away the severed edges of the material and guiding the body portion thereof toward a delivery point including vertical walls with tapered edges adjacent the cutters.

5. A machine of the character described comprising, a backing roll for supporting the material, a feed table at one side of the backing roll for slidably leading the material thereto, said feed table being adjustably mounted so as to slant upwardly toward the top of the backing roll, a draw roll for the material located at the side of the backing roll opposite to the feed table, a plurality of rotatable cutters arranged to cooperate with the backing roll, means for laterally guiding the material to the cutters, and means for pressing the material against the feed table.

6. A machine as defined in claim 5 in which means for varying the upwardly slanting angle of the feed table is located there beside comprising cooperating stanchions, angle irons, brackets and bolts.

7. A machine of the character described comprising, a backing roll for supporting the material, a feed table at one side of the backing roll for slidably leading the material thereto, a delivery table at the other side of the backing roll, said tables being adjustably mounted so as to slant upwardly toward the top of the backing roll, a draw roll for the material located at the same side of the backing roll as the delivery table, a plurality of rotatable cutters arranged to cooperate with the backing roll, means for rotating the cutters with their cutting edges moving in the same direction as the material, and means for laterally guiding the material to the cutters.

8. A machine of the character described comprising, a backing roll for supporting the material, a feed table at one side of the backing roll for slidably leading the material thereto, a delivery table at the other side of the backing roll, said tables being mounted so as to slant upwardly toward the top of the backing roll, a draw roll for the material located at the same side of the backing roll as the delivery table, a plurality of rotatable cutters arranged to cooperate with the backing roll, means for rotating the cutters with their cutting edges moving in the same direction as the material, means for laterally guiding the material to the cutters, and means for splitting the severed edges of the material away from the body portion thereof and laterally guiding the latter toward a delivery point.

9. A machine of the character described comprising, a backing roll for supporting the material, a feed table at one side of the backing roll for slidably leading the material thereto, a delivery table at the other side of the backing roll, said tables being mounted so as to slant upwardly toward the top of the backing roll, a draw roll for the material located at the same side of the backing roll as the delivery table, a cutter shaft mounted above the backing roll, a plurality of cutters fixed in spaced relationship on said shaft for cooperation with the backing roll, means for rotating the cutter shaft so that the cutting edges of the cutters move in the same direction as the travel of the material, means for laterally guiding the material to the cutters, and means for splitting the severed edges of the material away from the body portion thereof and laterally guiding the latter toward a delivery point.

10. A machine of the character described comprising, a backing roll for supporting the material, a feed table at one side of the backing roll, a delivery table at the other side of the backing roll, said tables being mounted so as to slant upwardly toward the top of the backing roll, a draw roll for the material located at the same side of the backing roll as the delivery table, a cutter shaft mounted above the backing roll, a plurality of cutters fixed in spaced relationship on said shaft for cooperation with the backing roll, means for rotating the cutter shaft so that the cutting edges of the cutters move in the same direction as the travel of the material, means for guiding the material to the cutters, and means for splitting the severed edges of the material away from the body portion thereof and guiding the latter toward a delivery point, said last named means being adjustable in the direction of the longitudinal axis of the cutter shaft.

11. A machine of the character described comprising, a backing roll for supporting the material, a feed table at one side of the backing roll for slidably leading the material thereto, a delivery table at the other side of the backing roll, said tables being mounted so as to slant upwardly toward the top of the backing roll, a draw roll for the material located at the same side of the backing roll as the delivery table, a cutter shaft mounted above the backing roll, a plurality of cutters in spaced relationship on said shaft for cooperation with the backing roll, means for rotating the cutter shaft so that the cutting edges of the cutters move in the same direction as the travel of the material, means for laterally guiding the material to the cutters, and means for splitting the severed edges of the material away from the body portion thereof and laterally guiding the latter toward a delivery point, said last named means including vertical walls with tapered edges adjacent the cutters.

12. A machine of the character described comprising, a draw roll for pulling the material therethrough, a backing roll for supporting the material, a cutter shaft mounted above the backing roll, a plurality of cutters in spaced relationship on said shaft for cooperating with the backing roll, an adjustable feed table for slidably leading the material to the backing roll, means for pressing the material against the feed table, a drive shaft, and driving means connecting the drive shaft with the draw roll, the cutter shaft and the backing roll, said feed table leading upwardly toward the top of the backing roll, and an adjustable delivery table on the opposite side of the backing roll leading downwardly from the top thereof for slidably delivering the material from the backing roll to the draw roll.

DUNCAN FERGUSON.
NELSON MacDOUGALL.
ERNST P. MEYER.

REFERENCES CITED

The following references are of record in the file of this patent:

UNITED STATES PATENTS

| Number | Name | Date |
|---|---|---|
| 55,336 | Merriam et al. | June 5, 1866 |
| 567,164 | Pope | Sept. 8, 1896 |
| 819,431 | Hurd | May 1, 1906 |
| 878,533 | Johnstone | Feb. 11, 1908 |
| 973,448 | Medved | Oct. 8, 1910 |
| 1,200,136 | Richardson | Oct. 3, 1916 |
| 1,642,081 | Munroe | Sept. 13, 1927 |
| 1,753,967 | Robinson | Apr. 8, 1930 |
| 1,859,570 | Mattler | May 24, 1932 |